United States Patent Office 3,029,159
Patented Apr. 10, 1962

3,029,159
BOBBIN AND METHOD OF TREATING
Roger Bliven, Hopedale, and Frank L. Allen, Jr., Hudson, Mass., and Joseph A. Budash, Aliquippa, Pa., assignors to Draper Corporation, Hopedale, Mass., a corporation of Maine
No Drawing. Filed Jan. 8, 1960, Ser. No. 1,177
6 Claims. (Cl. 117—59)

This invention relates to a novel method of treating wooden bobbins in order to improve their physical properties and to render them more suitable for their intended use in the textile industry, and to the bobbins thus treated.

This application is a continuation in part of application Serial No. 595,121, filed on July 2, 1956, now abandoned.

It is the general object of the invention to improve the physical properties of wooden textile bobbins so that they may be more resistant to abrasion and may better withstand without denting the various impact and crushing forces to which they are subjected.

It is a more specific object to impregnate these bobbins with certain materials which do not cause any swelling of the bobbins due to the impregnation and further, which minimize the swelling of the bobbins due to the high moisture conditions to which they are subjected.

A further object is that of providing bobbins of the type described with a tough, resilient, substantially integral finish which cannot be removed or damaged during use and which shall leave the bobbins in such condition that they require no varnish, lacquer or other external coating.

Another object is that of devising a bobbin so treated and finished that it is to an extent self-polishing, that is, the bobbin polishes itself in handling and in use.

It is a further object so to treat a wooden bobbin that the resulting product shall show a considerable increase in rigidity over the rigidity of the wood alone.

Another object is that of so treating bobbins that when impregnated, drained and baked, the product shall then be left in condition for immediate use without further treatment of any sort.

Wooden bobbins used in the textile industry are usually made of birch, maple or other woods and are externally coated with a varnish, lacquer or other finish. Attempts have been made to treat the wood with certain impregnants to improve its physical properties, but in general, these attempts have not been wholly successful and in fact, have for the most part, been expensive and leave the finished product tacky, brittle, too heavy or with some one or more undesirable characteristics. For example, phenolformaldehyde is not suitable because gases which are given off during curing result in swelling of the bobbin and further, that impregnant leaves a rough finish on the surface. For these reasons such methods of treatment and the resulting product have not met with anything like general or even widespread acceptance.

According to the invention hereinafter described in detail, wooden bobbins are treated with particular impregnants, drained and then baked to cure the resins. While subjected to baking during the initial stages, at least, the bobbins are tumbled or otherwise agitated in such manner as to cause them to be further drained of all excess impregnant and to prevent the formation of any beads or other localized deposits which may be baked in place. A second stage of baking may or may not be accompanied by agitation, but is preferably carried out at a higher temperature or the temperature may be gradually increased throughout a single stage.

Impregnants which may be used are comprised of monomers and low polymers of synthetic resins which may be cured to high polymers at atmospheric pressure.

The preferred resins are the polyesters and are comprised of the polymerization reaction product of an unsaturated polyester and a reactive monomer having vinyl unsaturation such as styrene, vinyl toluene, methylmethacrylate or diallylphthalate. Many unsaturated polyesters are commercially available and may be formed from the reaction between a polyhydric alcohol such as ethylene glycol, diethylene glycol, triethylene glycol, or propylene glycol, and an unsaturated polycarboxylic acid such as maleic acid or fumaric acid. The unsaturated polyester is preferably one which will cure readily and completely in the presence of air without becoming tacky. It should have a relatively low viscosity to permit easy penetration into the wood, not greater than 10 poises and preferably below about 4 poises at 25° centigrade after admixture with the monomer, and its pot life should be at least about one week at room temperature. A small amount of any one of a number of known polymerization catalysts is used in the curing, the peroxides, such as benzoyl peroxide or methyl ethyl ketone peroxide, being the most common.

The resin is permitted to permeate into the bobbins and curing then takes place in situ with the result that there is practically no distortion of the wood whose surface requires no subsequent finishing as is normally customary. The voids in the wood are filled with the impregnant which is itself of hard and tough nature and also imparts its own physical characteristics to the wood. Bobbins thus treated resist abrasion and blows which would otherwise cause nicks and dents. The rate of absorption of moisture of the resulting product during steaming or under the action of wetting agents is extremely low and remains low throughout the life of the bobbin. Distortion of shape or swelling are no longer serious problems. The strength, especially resistance to crushing, is increased so that one very serious fault of varnished wooden bobbins is obviated, that is, the propensity these bobbins have for crushing under the contractile forces exerted by certain yarns such as low twist nylons. When treated as herein described, wooden bobbins, especially weft pirns for use in automatic, bobbin-changing looms, successfully withstand the crushing forces exerted by these yarns.

*Example I*

The preparation of one particular unsaturated polyester which has been found to be especially suitable as an impregnant will now be set forth. The following compounds are added into a one liter flask:

| | Parts by weight |
|---|---|
| Maleic anhydride | 215.6 |
| Ortho-phthalic anhydride | 325.6 |
| Propylene glycol | 372.6 |
| Xylene | 80 |

The flask is equipped with a Dean and Stark condenser, thermometer and stirrer and the reaction takes place for four hours at a starting temperature of 165° C. which is increased gradually to 223° C. and to an acid number of 77. The xylene is then removed under a vacuum of 25 inches of mercury. Next, 80 parts by weight of styrene monomer and 0.025% by weight of hydroquinone were added to the solution which rapidly cooled to room temperature.

Then, 70% by weight of the above unsaturated polyester is added to 30% by weight of styrene monomer and 1 part by weight of benzoyl peroxide catalyst to comprise the impregnant which has a viscosity of 2.0 poises. Bobbin blanks are first dried to a point where their moisture content is less than 1% by weight, and are then turned to the desired shape and size. No allowance need be made for change of dimensions since the latter will remain practically stable during following treatment and the usual surface coating need not be added which would increase appreciably the external size of the product. Acceptable final dimensions and tolerances may be observed during the turning and other formative machining.

The bobbins are then loaded in a pressure type vessel from which air is then evacuated to establish a vacuum of about 25 inches of mercury. After maintaining this pressure for fifteen minutes, the above impregnant at room temperature is admitted to a point where it at least covers the bobbins. The bobbins should remain covered during the entire impregnating period and enough material should be introduced initially or the quantity replenished as may be necessary since considerable impregnant may be taken up by the wood.

The pressure in the vessel is increased to atmospheric after which the impregnant is permitted to permeate the wood for fifteen minutes. The bobbins are removed and drained for two hours, and are then cured by subjecting them to heat while tumbling. This part of the cycle should consume about 1½ hours starting at a temperature of about 150° F. and increasing it fairly evenly to about 250° F. at completion.

This results in an impregnated bobbin containing 27% by weight of resin which fills the voids in its cellulose structure for a considerable distance from the surface and on which there is no external coating of material to peel or chip. The bobbin is tack free and has a Barcol hardness of 50. After a 24-hour moisture absorption test in 2% "Seyco 7 N" solution, there was found to be a 23.2% weight gain, 3.9% dimension gain perpendicular to the grain and 7.8% dimension gain parallel to the grain.

In order to determine the compatability of variations in the styrene concentration with respect to the above propylene glycol maleate-phthalate resin, the following additional experiments were conducted.

*Example II*

To 23.5% by weight of the resin was added 76.5% by weight of styrene monomer and to this solution 1 part by weight of benzoyl peroxide catalyst and bobbins were impregnated in the manner set forth above, at the completion of which they were found to contain 34% by weight of resin and had a Barcol hardness of 50. A 24-hour immersion test in 2% "Seyco 7 N" solution showed a 20.3% weight gain and the same dimension gains in both directions as in Example I.

*Example III*

80% by weight of propylene glycol maleate-phthalate resin and 20% by weight of styrene were admixed and to the solution was added 1 part by weight of benzoyl peroxide.

Impregnation carried out as set forth in Example I resulted in bobbins having 19% by weight of resin and a Barcol hardness of 50. A 24-hour immersion test in 2% "Seyco 7 N" solution showed a 14.3% by weight moisture gain, a dimensional gain perpendicular to the grain of 2.9%, and parallel to the grain of 4.9%.

Further experiments were conducted to determine possible variations in the styrene concentration with respect to the propylene glycol maleate-phthalate resin solution by curing various mixtures of the two for 20 minutes at 250° F. with 1 part by weight of benzoyl peroxide. Results are tabulated below:

| Percent Resin by weight | Percent Styrene by weight | Tack Hot | Tack Cold | Barcol Hardness |
|---|---|---|---|---|
| 82.7 | 17.3 | Yes | No | 58 |
| 76.3 | 23.7 | No | No | 68 |
| 67.0 | 33.0 | No | No | 65 |
| 50.0 | 50.0 | No | No | 55 |
| 38.6 | 61.4 | No | No | 50 |
| 23.5 | 76.5 | No | No | 50 |

This indicates that the resin will cure satisfactorily over wide variations in its concentration with respect to the vinyl monomer. The above tabulation indicates that the Barcol hardness of the cured resin was at least 50 and that tackiness absent except in the case of the 82.7% resin concentration when hot—this was non-tacky after it cooled.

In order to determine the possible variation in catalyst concentration, a mixture of 63.5% of the same unsaturated polyester resin and 36.5% by weight of styrene was cured at 250° F. using benzoyl peroxide as the catalyst. It was found that the catalyst concentration may vary from about 0.1% by weight of the impregnant solution to about 2.0%, the Barcol hardness increasing from 55 at 0.1% to 65 at 2.0% catalyst concentration. Above 2.0% the cured resin was very brittle and crazed.

Many different catalysts were substituted for the benzoyl peroxide to cure a solution of 63.5% by weight of the same resin and 37.5% styrene without any variation in the Barcol hardness. Some of those which proved to be suitable and the amounts in weight percent used are:

|  | Percent |
|---|---|
| 50% solution of cyclohexanone peroxide in dibutylphthalate | 2 |
| 60% solution of methylethylketone peroxide in dimethylphthalate | 1 |
| t-Butylhydroperoxide | 1 |
| Cumenehydroperoxide | 1 |
| t-Butylperbenzoate | 1 |
| Di-t-butylperoxide | 1 |
| Methyl ethyl ketone peroxide | 1 |

The peroxide catalysts are the most suitable in such polymerization reactions although other type catalysts may be used in special instances. For example, where dyes are used for coloring purposes it is preferable to use organic azo compounds which do not attack the dyes as do the peroxides.

*Example IV*

A further unsaturated polyester resin was prepared from the following ingredients:

|  | Parts by weight |
|---|---|
| Maleic anhydride | 215.6 |
| o-Phthalic anhydride | 162.8 |
| Adipic acid | 160.8 |
| Propylene glycol | 376.2 |
| Xylene | 80.0 |

These were reacted for 3½ hours at a temperature increasing gradually from 163° C. to 231° C. and to an acid number of 55. The xylene was then removed under a vacuum of 25 inches of mercury. Upon the addition of 10% by weight styrene monomer and 0.025% by weight hydroquinone, the resin was rapidly cooled to room temperature and was ready for use.

A mixture of 75% by weight of this propylene glycol maleate-phthalate-adipate resin and 25% by weight of styrene to which was added 1 part by weight of benzoyl peroxide was used to impregnate bobbins as set forth in Example I at the termination of which they were found to contain 21% by weight of resin, and had a Barcol hardness of 50. A 24-hour 2% "Seyco 7 N" immersion test resulted in a moisture gain of 24.4% by weight, and in a dimensional gain of 4.4% in a direction perpendicular to the grain and 9.2% in a direction parallel to the grain.

*Example V*

A 50–50 mixture of the resin and monomer of Example IV with the same catalyst was used to impregnate bobbins also as set forth in Example I. These were found to contain 34% by weight of resin and possessed a Barcol hardness of 50. The same immersion test increased the weight by 21.6% and dimensional gains were as in Example IV.

Following are examples of commercial unsaturated polyester resins which were found to give excellent results at least insofar as hardness and dimensional stability are concerned, impregnation being carried out as in Example I.

*Example VI*

| | Parts by weight |
|---|---|
| Vibrin 151 [1] (containing about 40% styrene) | 94 |
| Styrene monomer | 5 |
| Benzoyl peroxide | 1 |

[1] Vibrin 151 is manufactured by the Naugatuck Chemical Co., Naugatuck, Connecticut.

*Example VII*

| | Parts by weight |
|---|---|
| Polylite 8027 [1] | 50 |
| Styrene monomer | 50 |
| Benzoyl peroxide | 1 |

[1] Polylite 8027 is an unsaturated polyester containing about 40% styrene and is manufactured by Reichold Chemicals, Inc., White Plains, New York.

*Example VIII*

| | Parts by weight |
|---|---|
| IC #237 [1] | 99 |
| Benzoyl peroxide | 1 |

[1] IC #237 is a resin comprised of 55% of unsaturated polyester and 45% styrene monomer and is manufactured by the Interchemical Corporation, Newark, New Jersey.

In these examples which are, of course, specific to actual processes found practical, the times and temperatures may be varied within limits while still arriving at the same desired end. Some impregnants cure more quickly than others, but the cycle of curing is generally confined within a period of from one to six hours. The temperatures may be started at close to room temperature or considerably higher and may be advanced gradually or one temperature maintained for a period of time and then elevated to a much higher one rather abruptly so long as the limits run between about 150° F. to 300° F. Lower temperatures become wasteful of time while those higher than about 300° may have an undesired effect upon the wood. It is not advisable to subject the impregnant to too great a degree of heat at the start.

The unsaturated polyesters which may be utilized as impregnants according to the invention are not intended to be limited to those specified particularly in the above examples. Applicants have tested and tried many unsaturated polyesters with equal success, although it is preferred to utilize those which possess the physical properties above noted. The percentage of that resin in an impregnating composition is not critical and can be varied over wide ranges as indicated from the examples.

A particularly advantageous result of the polyester impregnation is evident in the hardness of a treated bobbin. Where the dried wood, usually birch or maple, exhibits a standard Barcol hardness of between 0 to 10 before impregnation, the treated wood has a Barcol hardness of from about 50 to 70, which is equivalent to the hardness of the fully cured resin alone. Thus, a novel combination of the hardness and other durable characteristics of the resin with the reinforcing strength of the wood has been achieved.

Further, the diameter of the polyester impregnated bobbins has remained unchanged from that of the untreated wood, indicating that no surface coating has been applied to the wood. Moisture absorption tests show that the impregnated bobbins take on water at much lower rates than non-impregnated bobbins.

The product resulting has embodied therein the advantages above noted and is much desired because of its resistance to denting, freedom from tackiness, excellence of finish without any possibility of chipping or peeling and desirably improved characteristics when subjected to moisture. The bobbins are given a greater rigidity and that is found advantageous when winding at extreme speeds, for example, where lack of rigidity or a tendency to give or flex has made it hard to hold a bobbin in a chuck or the like at speeds in excess of 12,000 r.p.m.

The invention has been disclosed by reference to several examples all falling within one generic concept. Of course, other examples could be cited and the invention is, therefore, not limited to what has been specifically described, but is intended to embrace all variations and modifications thereof falling within the spirit of the invention and the scope of the claims.

We claim:

1. A method of treating wooden textile bobbins which comprises (1) drying the wood of said bobbins to a point where their moisture content is less than about 1% by weight, (2) subjecting said bobbins to a vacuum and then completely covering said bobbins with an unsaturated polyester modified with a reactive monomer having vinyl unsaturation, (3) impregnating said bobbins at atmospherical pressure, (4) draining excess impregnant from said bobbins, and (5) curing said impregnant in situ by baking the impregnated bobbins while tumbling them at temperatures of from about 150° F. increasing to about 250° F. at completion, the dimensions of said bobbins being substantially unchanged by said impregnation.

2. The method of claim 1 wherein a catalyst in contrations of from about 0.1 to 2.0% by weight of impregnant is used in the curing.

3. The method of claim 1 wherein the concentration of the unsaturated polyester is between about 23.5 and 82.7% by weight of the impregnant.

4. The method of claim 1 wherein the monomer is selected from the group consisting of styrene, methyl methacrylate and diallylphthalate.

5. A wooden textile bobbin the wood of which has been dried to less than about 1% by weight of moisture and then impregnated substantially completely therethrough with the polymerization reaction product of an unsaturated polyester modified with a reactive monomer having vinyl unsaturation, said reaction product being confined within the dimensions of said bobbin, said dimensions further being substantially unchanged by said impregnation.

6. The bobbin of claim 5 wherein said monomer is selected from the group consisting of styrene, methyl methacrylate and diallylphthalate.

References Cited in the file of this patent

UNITED STATES PATENTS

| 2,020,172 | Cotchett | Nov. 5, 1935 |
| 2,591,768 | Austin | Apr. 8, 1952 |
| 2,867,543 | Braun | Jan. 6, 1959 |